United States Patent Office 3,491,104
Patented Jan. 20, 1970

3,491,104
PRODUCTION OF TETRAHYDROBIPYRIDYLS
John Edward Colchester and John Hubert Entwisle, The Heath, Runcorn, England, assignors to Imperial Chemical Industries Limited, Millbank, London, England, a corporation of Great Britain
No Drawing. Filed May 20, 1966, Ser. No. 551,532
Claims priority, application Great Britain, May 28, 1965, 22,774/65
Int. Cl. C07d *31/22, 31/02;* A01n *9/22*
U.S. Cl. 260—296               19 Claims

ABSTRACT OF THE DISCLOSURE

There is provided a process for the production of N:N'-disubstituted-4:4'-bipyridylium salt by interacting a pyridine with a solution of an alkali metal or alkaline earth metal in a substantially anhydrous liquid medium containing ammonia to form a metal-pyridine interaction product. The so formed product is interacted with an organic halogen containing compound having only one reactive halogen per molecule to form a N:N'-disubstituted 1:1':4:4'-tetrahydro-4:4'-bipyridyl, which is subsequently converted to the bipyridylium salt.

---

This invention relates to the production of N:N'-disubstituted bipyridylium salts and particularly to the production of bis quaternary salts of 4:4'-bipyridyl.

It is known to interact sodium and pyridine at or above ambient temperature and then to react the resulting sodium pyridine interaction product with an alkyl halide, but hitherto this reaction has only produced a syrup which exhibited some of the properties of a tetrahydrobipyridyl but from which it was not possible to isolate N:N'-dialkyl tetrahydrobipyridyls. It is also known to form a metal pyridine interaction product for example a sodium pyridine interaction product by the action of a solution of a metal in an anhydrous medium containing ammonia on a pyridine.

We have now found a convenient process for the production of bipyridylium salts from pyridines using a metal pyridine interaction product.

Thus according to our invention we provide a process for the production of an N:N'-disubstituted bipyridylium salt which comprises interacting a pyridine with a solution of an alkali metal or alkali earth metal in a substantially anhydrous medium containing ammonia to form a metal-pyridine interaction product, reacting the metal-pyridine interaction product with an organic compound containing only one reactive halogen atom per molecule to form an N:N'-disubstituted 1:1':4:4'-tetrahydro-4:4'-bipyridyl, and thereafter converting the N:N'-disubstituted 1:1':4:4'-tetrahydro-4:4'-bipyridyl to a bipyridylium salt.

The metal solution may be made and interacted with the pyridine. In particular we prefer to use a solution of an alkali metal, for example sodium or potassium in a substantially anhydrous solvent containing liquid ammonia and optionally an inert organic diluent such as an ether. Suitable ethers for this purpose include in particular polyethers in which two ether oxygen atoms are separated by a chain of two carbon atoms. It is preferred that the ether should contain in its structure at least one terminal methoxy group. Thus there may be used for example, ethers of tetrahydrofurfuryl alcohol (for example the methyl ether) and di-ethers of ethylene glycol, and especially 1:2 - dimethoxyethane, bis-(2-methoxyethyl) ether and 1:2-bis-(2-methoxyethyl) ether is most suitable. Alternatively there may be used a solution of lithium or calcium in a similar solvent to that described above for sodium and potassium. The metal-pyridine interaction product produced by the use of sodium in our process is we believe an N:N'-disodium 1:1':4:4'-tetrahydro-4:4'-bipyridyl.

The pyridine used in the production of the metal-pyridine interaction product may be pyridine itself, or may be a pyridine carrying substituents which do not interfere with the reaction, for example pyridines carrying alkyl substituents in the 2, 3, 5 or 6 positions.

The organic halogen compound should contain only one halogen atom per molecule, the halogen atom preferably being chlorine, bromine or iodine. Use of compounds containing more than one halogen atom tends to result in the production of high molecular weight polymeric materials which are not useful in our present invention. The organic halogen compound may be an aliphatic or an aromatic compound and may be, in particular, an alkyl or an aralkyl compound. We prefer to use aliphatic and particularly alkyl halides.

The metal-pyridine interaction product is produced as a suspension or slurry and its isolation from the suspension or slurry can be difficult and dangerous because of its explosive nature when in contact with air. We therefore prefer to use the metal-pyridine interaction product as the suspension or slurry without intermediate isolation. The proportion of the solvent in the suspension or slurry should be at least sufficient to wet the metal-pyridine interaction product, but the normal techniques for the manufacture of the metal-pyridine interaction product usually produce a composition containing rather more than the minimum proportion of solvent. The organic halogen compound may be used as a solution in a solvent similar to, or the same as that in which the metal-pyridine interaction product is dissolved, or may be used undiluted in the gaseous or liquid state. The most suitable form in which to use the organic halogen compound will vary with the particular compound used and can be found by simple experiment. The organic halogen compound is preferably added to the suspension or slurry of the metal-pyridine interaction product, or, alternatively, the metal-pyridine interaction product may be added to the organic halogen compound. The reaction of the organic halogen compound and the metal-pyridine interaction product is strongly exothermic and it is therefore desirable to provide some method of removing heat from the reaction mixture. A convenient method of controlling the temperature of the reaction when using a solution or slurry of the metal-pyridine interaction product containing liquid ammonia is to allow some of the liquid ammonia to evaporate. We prefer to interact the organic halogen compound and the metal-pyridine interaction product at a temperature between —80° C. and 0° C.

We prefer to use two or rather more than two moles of the organic halogen compound for each mole of metal-pyridine interaction product; less than two moles of the the organic halogen compound for each mole of metal-pyridine interaction product unreacted and may lead to the production of unwanted byproducts in the later stages of the process.

The time the reaction takes to reach completion will vary the reagents, with their concentration and with the temperature, but we have in general found that times of between 15 minutes and 24 hours are suitable.

When the reaction of the metal-pyridine interaction product and the organic halogen compound is complete the N:N'-disubstituted tetrahydro-4:4'-bipyridyl may be recovered from the reaction mixture by conventional methods for example excess solvent may be removed by evaporation and the tetrahydrobipyridyl may be extracted from the residue by an organic solvent such as ether. Alternatively the crude reaction mixture containing the N:N'-disubstituted tetrahydro-4:4'-bipyridyl or the crude reaction mixture from which the more volatile portion of the solvent has been removed by evaporation may be used directly in the conversion of the N:N'-disubstituted tetrahydro-4:4'-bipyridyl to bipyridylium salts.

The N:N'-disubstituted tetrahydro-4:4'-bipyridyls may be converted to N:N'-disubstituted biypyridylium salts, which are useful as herbicides, for example by treating the N:N'-disubstituted tetrahydro-4:4'-bipyridyl with an oxidising agent which is a hydrogen acceptor and has a redox potential more positive than −1.48 volts. Suitable oxidising agents for use in this process are quinones such as benzoquinone and readily reduced unsaturated carboxylic acids and their derivatives for example maleic acid and maleic anhydride.

The invention is illustrated but not limited by reference to the following example.

EXAMPLE 5 gms. of sodium were dissolved in 300 mls. of liquid ammonia and stirred under an argon atmosphere at −35° C. for one hour. Pyridine (17 mls.) was added to the mixture until the blue colour was discharged. Gaseous methyl chloride was then passed into the stirred mixture in a slow stream for about 30 minutes until the mixture became colourless. To ensure complete reaction a further 10 gms. of liquid methyl chloride were added followed by 300 mls. of diethyl ether. The reaction mixture was transferred into an argon-filled flask and the ammonia and excess methyl chloride removed in a stream of argon. The remaining solution was dried with 55 gms. anhydrous magnesium sulphate, filtered and the ether removed by evaporation to yield 15.5 gms. of N:N'-dimethyl tetrahydro-4:4'-bipyridyl. This tetrahydrobipyridyl was then dissolved in bis-(2-methoxyethyl) ether (150 mls.) and a solution of 1:4'-benzoquinone (18.4 gms.) in bis-(2-methoxyethyl) ether (250 mls.) was added drop-wise with rapid stirring. The addition was made at 0° C. over a period of 50 minutes, and care was taken to exclude moisture and air. A bright violet blue solid separated immediately the quinone was added. When addition was complete an aqueous solution of hydrochloric acid (25 gms. of 35% acid diluted with 200 mls. of water) was added gradually. The resulting solution was analysed polarographically and colourimetrically for the N:N'-dimethyl-4:4'-bipyridylium ion. The yield of N:N'-dimethyl-4:4'-bipyridylium chloride was approximately 65% of theory based on the N:N'-dimethyl tetrahydro-4:4'-bipyridyl.

What we claim is:

1. A process for the production of an N:N'-disubstituted-4:4'-bipyridylium salt which comprises interacting a pyridine with a solution of an alkali metal or alkaline earth metal in a substantially anhydrous liquid medium containing ammonia to form a metal-pyridine interaction product, interacting the resulting metal-pyridine interaction product with an organic aliphatic halogen compound containing only one reactive halogen atom per molecule to form an N:N'-disubstituted 1:1':4:4'-tetrahydro-4:4'-bipyridyl, and therafter converting the N:N'-disubstituted 1:1':4:4'-tetrahydro-4:4'-bipyridyl to a bipyridylium salt by oxidation.

2. A process as claimed in claim 1 wherein the pyridine is pyridine itself.

3. A process as claimed in claim 1 wherein the metal is sodium or potassium.

4. A process as claimed in claim 1 wherein the metal solution contains an inert organic diluent in addition to the ammonia.

5. A process as claimed in claim 4 wherein the inert organic diluent is a polyether in which two ether oxygen atoms are separated by a chain of two carbon atoms.

6. A process as claimed in claim 5 wherein the ether is bis-(2-methoxyethyl) ether.

7. A process as claimed in claim 1 wherein the organic halogen compound contains only one halogen atom per molecule.

8. A process as claimed in claim 7 wherein the organic halogen compound is an alkyl halide.

9. A process as claimed in claim 1 wherein the organic halogen compound is a chloride, bromide or iodide.

10. A process as claimed in claim 1 wherein the organic halogen compound is methyl chloride.

11. A process as claimed in claim 1 wherein the metal-pyridine interaction product, as a suspension, is interacted with the organic halide.

12. A process as claimed in claim 1 wherein the organic halide is added to the metal-pyridine interaction product.

13. A process as claimed in claim 1 wherein the reaction between the metal-pyridine interaction product and the organic halide is cooled.

14. A process as claimed in claim 1 wherein about 2 moles of organic halogen compound are used per mole of metal-pyridine interaction product.

15. A process as claimed in claim 1 wherein the N:N'-disubstituted tetrahydro-4:4'-bipyridyl is not isolated before it is converted to a bipyridylium salt.

16. A process as claimed in claim 1 wherein the N:N'-disubstituted tetrahydro-4:4'-bipyridyl is converted to the corresponding bipyridlium salt by an organic oxidising agent which is a hydrogen acceptor and has a redox potential more positive than −1.48 volts.

17. A process as claimed in claim 16 wherein the organic oxidising agent is a quinone.

18. In a process for the production of N:N'-disubstituted 4:4'-bipyridylium salt by interacting a pyridine with a solution of an alkali metal or alkaline earth metal and oxidizing the resulting interaction product, the improvement comprising preparing the interaction product to be oxidized by carrying out the interaction in an anhydrous liquid medium containing ammonia to form a metal-pyridine interaction product and interacting the resulting metal-pyridine interaction product with an alkyl halide having only one reactive halogen atom per molecule to form an N:N'-disubstituted 1:1':4:4'-tetrahydro-4:4'-bipyridyl.

19. The process of claim 18 wherein the alkyl halide is methyl chloride.

References Cited

UNITED STATES PATENTS

| 3,326,126 | 6/1967 | Homer | 260—296 |
| 3,340,041 | 9/1967 | Homer et al. | 260—296 |

OTHER REFERENCES

Chem. Abstracts, vol. 7, p. 2118 (1923), abstracting German Patent No. 358,397.

Klingsberg: Pyridin and Derivatives, Part II, pp. 224–5, Interscience, 1961, QD401K5.

Harris et al.: J. Am. Chem. Soc., vol. 73, pp. 39559–63 (1951), QD1.A5.

HENRY R. JILES, Primary Examiner

A. L. ROTMAN, Assistant Examiner

U.S. Cl. X.R.

71—94